250/203

United States Patent

[11] 3,593,286

[72] Inventor Norman G. Altman
32 Sammis Lane, White Plains, N.Y. 10605

[21] Appl. No. 779,442
[22] Filed Nov. 27, 1968
[45] Patented July 13, 1971

[54] PATTERN RECOGNITION SYSTEM HAVING ELECTRONICALLY CONTROLLABLE APERTURE SHAPE, SCAN SHAPE, AND SCAN POSITION
12 Claims, 19 Drawing Figs.

[52] U.S. Cl. .......... 340/146.3, 178/6.8, 250/203
[51] Int. Cl. .......... G06k 9/04, H04n 3/00
[50] Field of Search .......... 340/146.3; 178/6, 6.8, 7.7; 250/202, 203; 343/6, 7

[56] References Cited

UNITED STATES PATENTS

| | | | |
|---|---|---|---|
| 3,240,942 | 3/1966 | Birnbaum et al. | 250/203 |
| 3,290,506 | 12/1966 | Bertram | 250/203 |
| 3,409,777 | 11/1968 | Cohen et al. | 250/203 |
| 3,476,197 | 11/1969 | Penix et al. | 178/6.8 |
| 3,432,674 | 3/1969 | Hobrough | 178/6.8 UX |

*Primary Examiner*—Maynard R. Wilbur
*Assistant Examiner*—Leo H. Boudreau
*Attorney*—Michael Ebert

ABSTRACT: A pattern recognition system wherein an image dissector tube is used to provide a scan of an optical image, which scan, when used to establish the degree of similarity of two patterns or changes occurring in a single pattern, is capable of being modified to produce the maximum information required to establish said similarity or change, such modification being achieved by changing the electronic commands controlling the position and movement of the electronic image of the deflectable photomultiplier such that the size, shape, and position of the scanned area and the size of the effective aperture used to generate the scan is modified by appropriate control circuits (normally used in a feedback mode) to insure that the said modification increases the quantity, accuracy, and processability of the said information, full use being made of all a priori knowledge available to constrain scan size, shape, and position, and effective aperture size to further insure optimum scan parameters to provide the required information in the required form.

INVENTOR.
NORMAN G. ALTMAN
BY [signature]
ATTORNEY

INVENTOR.
NORMAN G. ALTMAN
BY
ATTORNEY

System Timing Diagram

INVENTOR.
NORMAN G. ALTMAN

BY [signature]
ATTORNEY

SYSTEM CORRELATOR

INVENTOR.
NORMAN G. ALTMAN
BY [signature]
ATTORNEY

INVENTOR.
NORMAN G. ALTMAN
BY Michael Ebert
ATTORNEY

PATTERN RECOGNITION SYSTEM HAVING ELECTRONICALLY CONTROLLABLE APERTURE SHAPE, SCAN SHAPE, AND SCAN POSITION

This invention relates generally to pattern recognition systems and more particularly to a system in which the pattern is sensed by an image dissector tube so driven as to produce the effect of scanning with a large aperture whose shape and path are optimized to produce the required information from the pattern being examined.

Pattern recognition may be divided into two broad categories: (a) recognition based on defining characteristics and catagorizing or classifying patterns, and (b) recognition based on treating the pattern as mathematical functions.

Recognition based on defining characteristics is best typified by the efforts that have been made to read printed symbols such as the digits 0 through 9. Here the goal is to determine those characteristics that distinguish one of the symbols (for instance a "2") from all of the other symbols in the class. This set of characteristics that define the "2" and allow it to be distinguished from the other members of the class is then generated into a set of "rules," and these rules are used to search printed material, patterns, test charts, etc., to recognize and classify each of the symbols for which rules have been established and properly coded for use.

Similar recognition and classification requirements arise in the field of photo interpretation, particularly for military applications, where it is desirable to find and separate patterns denoting "works of man" from other works of man and also, in some cases, "works of nature." In examining selected patterns of manmade objects, it is then necessary to find some indicia that will allow one to be separated from another: for instance, an airfield or a bridge is to be distinguished from other works of man. "Airfield" characteristics and "bridge" characteristics have been studied and developed into a type of matrix against which the characteristics of the unknown feature are compared to determine whether it has sufficient "bridgeness" to call it a bridge or sufficient "airfieldness" to call it an airfield.

There is a completely separate and distinct class of problems in the field of pattern recognition wherein there is no need for nor desire to abstract any "recognition-type" information from the pattern; the pattern is considered simply as a unique, readily definable mathematical function of X and Y. The distinguishing features of this function are used as such to define the position and form of the pattern that generated the function.

This situation arises rather frequently. For instance, if it is desired to point an instrument (such as a camera or a telescope) mounted on a moving vehicle at some object, or area, not moving at the same speed as the vehicle, it is necessary to slew the instrument to insure that its line of sight continues to point at the item of interest. There is no requirement for identifying the nature of the area of interest. In the tracking application, the device merely replaces and improves on the human observer to insure that the image of interest remains stable within the field of view of the instrument.

Another situation wherein it is necessary to define the position and form of a pattern rather than classify the pattern arises when measuring the angular rate of motion of a moving vehicle with respect to the local terrain. This is of particular interest when taking photography from a moving vehicle, because if the motion between the vehicle and the subject is uncompensated, the photographic image will very often be blurred or smeared to an objectionable degree. To prevent this smear, it is necessary to have a device (preferably completely automatic) that measures the angular rate of motion between camera and subject and provides compensation to insure that the image is not moving on the film during the time the photograph is being taken. One standard technique for measuring this angular rate of change (called V/H in aerial photography) is to memorize an arbitrary area of the local terrain and track it while the vehicle is flying over it. This will then directly provide the image motion compensation required to stabilize the image on the film.

Another situation wherein recognition is based on the mathematical function defining the pattern arises in the navigation of aircraft, particularly under circumstances where local maps and electronic navigation aids are either undependable or completely unavailable. In this case (providing photography is available of the terrain to be flown over), checkpoints of the terrain are chosen from the photographs and memorized in proper sequence by the navigation equipment of the vehicle. Navigation then consists of sequentially searching for, acquiring, locking onto, and continuing to point to each navigation checkpoint in turn. The bearing and the rate of change of the bearing with respect to the selected navigation checkpoints gives sufficient information to completely navigate the vehicle over the prephotographed terrain.

In all of the situations described above, there is no requirement that the instrument recognize the type of pattern that has been used. The only requirement for successful operation is to insure that the indicia of the point or area of interest are available for the instrument such that it can recognize the same point or area on command when presented, and it can properly indicate that it has made such a recognition.

Many sensors have been developed to provide the input information necessary for a pattern recognition system. Most of these have been developed for systems that identify a member in a class, namely a "2" or a "bridge." Techniques used include electronic scanners such as a videcon, image orthicon, or flying spot scanner with a suitable detector. Mechanical scanners of various types have also been used. These include discs, spinning mirrors, spinning prisms, and mechanically moved apertures of various shapes whose motions are usually of a rotational or oscillatory nature. In addition, the more recent state of the art has made use of matrices of sensitive devices, sometimes many hundreds of devices per matrix. These are scanned by an electronic multiplexer to provide a video signal that defines the image viewed by the matrix.

Existing sensors, while satisfactory for recognizing a member of a class, have serious drawbacks when used in a pattern recognition system based on mathematical function. The point scan devices, such as the videcon and the flying spot scanner, suffer from the following disadvantages:

A. Because of the inherent nature of the point scan, a high resolution image is required to recognize and identify a memorized pattern. As an airborne instrument operating under operational conditions, the imposition of the requirement for a high resolution image means that the standoff range of the instrument (that is, the distance between the instrument itself and the pattern being examined on the local terrain) is quite limited. This limitation exists even under conditions of ideal seeing, that is, conditions in which the problems introduced by the atmospheric attenuation, etc., are relatively small. However, under circumstances where seeing conditions are not ideal (that is, when there is any haze or similar interferences), the standoff range of a point-type scanner is limited even further. Studies in the field have shown that for practical systems a 10,000-foot standoff range is normally maximum, and 20,000 feet is considered completely unachievable with a point scan system.

B. The point scan is overly sensitive to slight variations in the pattern being examined. It is particularly sensitive to changes in geometry resulting from changes in aspect angle and changes in sun angle (producing shadow variations). Also, the normal point scan will produce a video signal that is quite sensitive to changes as a result of the presence of man and his works within the area of interest. For instance, a parking lot with automobiles in it will look different than the same parking lot when empty. Similarly, a field with two or three new roads added will look quite different as a result of the added roads. Since the practical requirements of navigation, guidance, etc., are such that it is not desirable to be forced to choose an area that will be completely free of any manmade changes for a long period of time, this sort of sensitivity imposes a severe limitation on the point-type scan under meaningful operational conditions for navigation, guidance, etc.

There are existing systems that avoid the drawbacks incident to the use of point scanners by mechanical scanning with a shaped aperture. Such mechanical aperture scanners enjoy the following advantages:

A. Because the mechanical aperture scan does not require a high resolution image (it only looks at the low frequency content of the image presented to it), the cutoff characteristics of the modulation transfer function of the atmosphere do not affect the quality of the image as seen by the scanner until the atmospheric transfer function has drastically reduced the low frequency content of the image. Under good seeing conditions, this normally will not occur at standoff ranges of less than 70,000 feet, compared with the 10,000-foot limitation of the point scanner.

B. Because a scan using a large shaped aperture is entirely insensitive to "fine line" modifications in the image resulting from manmade changes, it can be used for such applications as navigation, guidance, etc., without restriction as to the nature of the areas chosen for use as checkpoints.

Despite these advantages of the shaped mechanical aperture scan, a number of important limitations restrict its application. These limitations include the following:

1. For searching and tracking, existing systems require mechanical gimbals. This increases the required size and weight of a complete system inordinately and in many situations, such systems are precluded because the vehicle that is planned for the mission cannot provide the space for a fully gimballed system. In addition, a system employing mechanical gimbals is of necessity a relatively slow-response system and is severely limited in slewing rate, further constraining the permissible operating parameters of the vehicle on which the system is mounted.
2. Existing systems cannot be servoed to follow scale changes without the use of external equipment such as a zoom lens; the zoom lens approach has many disadvantages including that of rather large size and weight. Also, the zoom lens normally introduces additional errors because of the difficulty of maintaining the line of sight stable while the magnification is being changed. The requirement for accepting variations in scale is one imposed by many airborne missions in which an area should be tracked even as the vehicle is flying toward or away from it.
3. Although existing sensors that use mechanical scan with a shaped aperture have the ability to accept geometrical changes due to changes in aspect angle, these changes reduce the quality of the correlation between the information generated by scanning the pattern and reference information. It is highly desirable to have a method of servoing the scan such that these differences are minimized, and correlation quality is not compromised. Such a servoing technique cannot be used with existing devices.
4. Existing devices do not provide sufficient flexibility to meet the scanning requirements of specialized applications. In particular, there are applications in which a cog wheel type scan is apparently optimum. Without very complicated mechanisms, such patterns cannot be generated by existing aperture scan techniques.
5. In some applications it is necessary to measure the position between the memorized pattern and that being examined in real time to accuracies of a few microinches. Under these circumstances it is important that the scanner introduce no displacement in the image being examined. This in turn almost precludes the use of mechanical scanners, since no matter how carefully they are built, they introduce some vibration and some microinch level variation due to imperfections in bearings; this imposes a limitation on the system when very high precision metrological instruments are being designed.

The primary object of this invention is to provide a system to measure the number of points (or small areas) of correspondence and the degree or level of correspondence of each corresponding point or a small area when comparing two patterns, each considered as a two-dimensional mathematical function. In this sense, one of the two patterns being compared is recognized as being the same as or identical to the other when a signal developed by the system exceeds a predetermined threshhold, which signal is a function of the number of points or small areas of correspondence between the two patterns and the degree of such correspondence.

Further: the invention can determine the type and magnitude of the distortions and/or displacements that differentiate two otherwise "identical" patterns and generate signals proportional to the magnitude (and, where applicable, the sense) of the differential distortions and/or displacements.

Further: the invention can modify the size, shape, and/or position of the scan pattern used and/or the effective scan aperture used such that the video signal (herein called the signal signature) obtained by scanning a pattern subjected to certain "standard" distortions and/or displacements can be made identical to the signal signature obtained from an undistorted (herein called the "reference") pattern.

Further: identicality of the signal signature scan be maintained using any designated "reference" pattern that is capable of being produced from the pattern being scanned by any combination of "standard" distortions or displacements.

It is a further object of this invention to provide these functions in a manner that preserves all of the advantages of systems employing mechanically moving large shaped apertures and yet eliminates the above-described important limitations thereof. In this invention no mechanical gimballing is used; high speed slewing is obtained completely electronically. A system in accordance with the invention contains an electronic high speed zoom that operates over a range in excess of 4 times. With this 4-times electronic zoom instrumented as the correction loop in an optical zoom, an overall very high speed zoom with a range which is the product of the electronic zoom and the optical zoom can be achieved.

In addition to the advantages of rapid slew rate and electronic zoom, this invention provides another very great advantage over and above other scan systems that have been devised in the past to provide inputs for correlators; the shape and position of the scan and the effective shape of the aperture can be modified to compensate for geometric distortion in the image being examined. This is particularly important in situations such as those that arise when viewing fast moving terrain at low depression angles of the system line of sight. Under these circumstances, the image moves rapidly, so that tracking is difficult even under the best of circumstances. If in addition the system line of sight is swung through a large angle in order to track an area of interest on the terrain, the resulting geometric distortion is great enough to make the tracking and correlation much more difficult. Compensation for the variations in image distortion due to the change in aspect angle improves tracking accuracy and achievable tracking speed appreciably.

Briefly stated, the object of this invention is accomplished in a pattern recognition system incorporating an image dissector tube onto whose photocathode is projected an optical image of the area being observed, an electronic image thereof being produced on an anode having an aperture therein. The tube includes means to deflect said electronic image with respect to said aperture to produce an output signal.

Sweep voltages are applied by a scanning circuit to the tube deflection means to effect deflection in an *X* direction and in a *Y* direction normal thereto to produce in the output of the tube a video signal (called, for this purpose, a signal signature) which is a function of the scan pattern and the optical image scanned. Two such signal signatures can then be compared in a correlator to develop in the output of the correlator a composite signal having distinct error components representative of the displacement and distortion between the images represented by the two signal signatures.

The error components in the composite signal are sorted into separate error signals which may, after suitable processing, be applied to the scanning circuit to modify the scan pattern such that the two signal signatures are driven toward identicality, or the error voltages may be otherwise used to indicate displacement and/or distortion of one image referred to the other (herein after referred to as the reference image). The use to which the error signals representing image displacement are put depend of course on the application of the system.

In a system in accordance with the invention, an electronic analog of a mechanical scanning shaped aperture of controlled size is generated by so modulating the sweep voltages as to effectively enlarge the dimensions of the aperture.

For a better understanding of the invention as well as other objects and features thereof, reference is made to the following detailed description of a specific embodiment of the general principles of the invention, namely, a V/H sensor, to be read in conjunction with the accompanying drawing wherein:

FIG. 1 schematically illustrates, in longitudinal section, an image dissector tube of the type included in a pattern recognition system in accordance with the invention;

Figure 13:
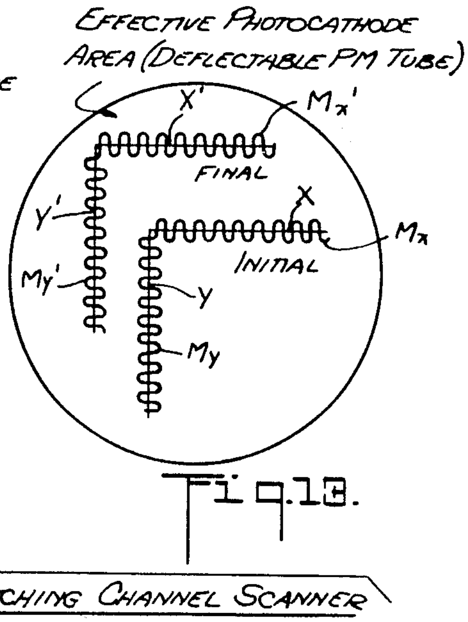
Figure 12:
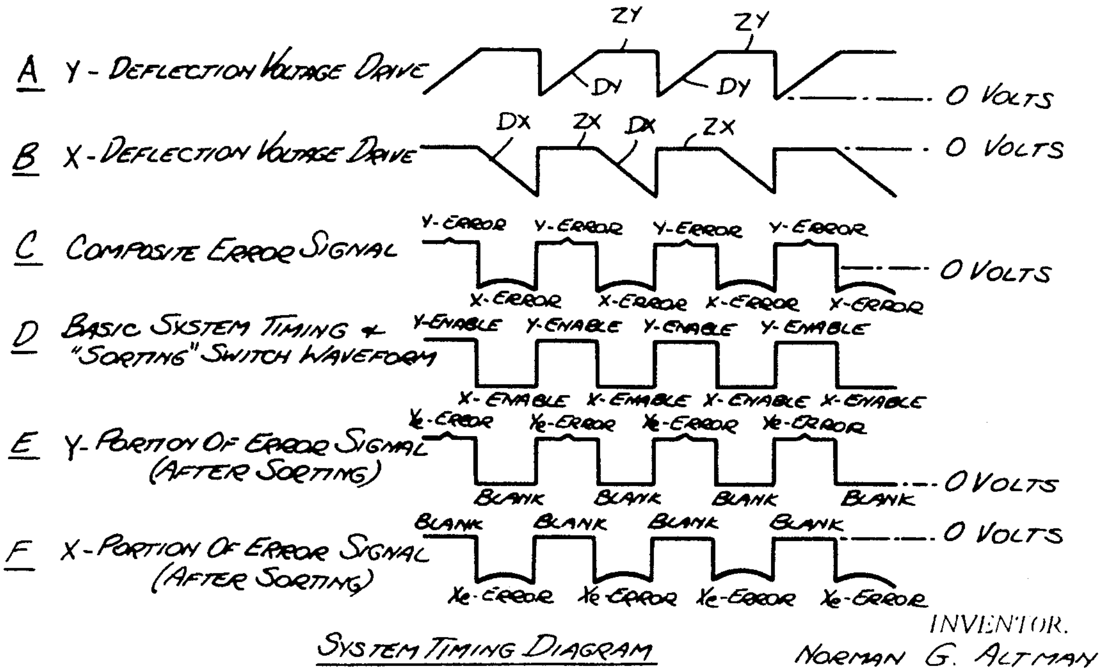
Figure 14:
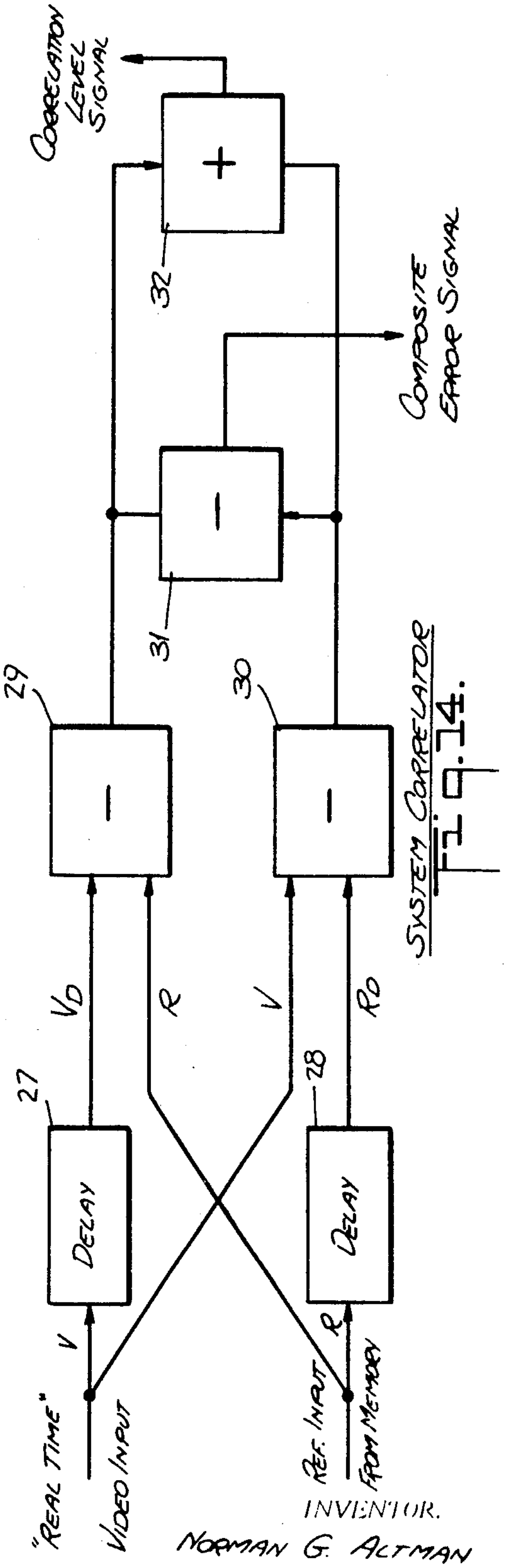
Figures 15, 16, 17, 18, 19:
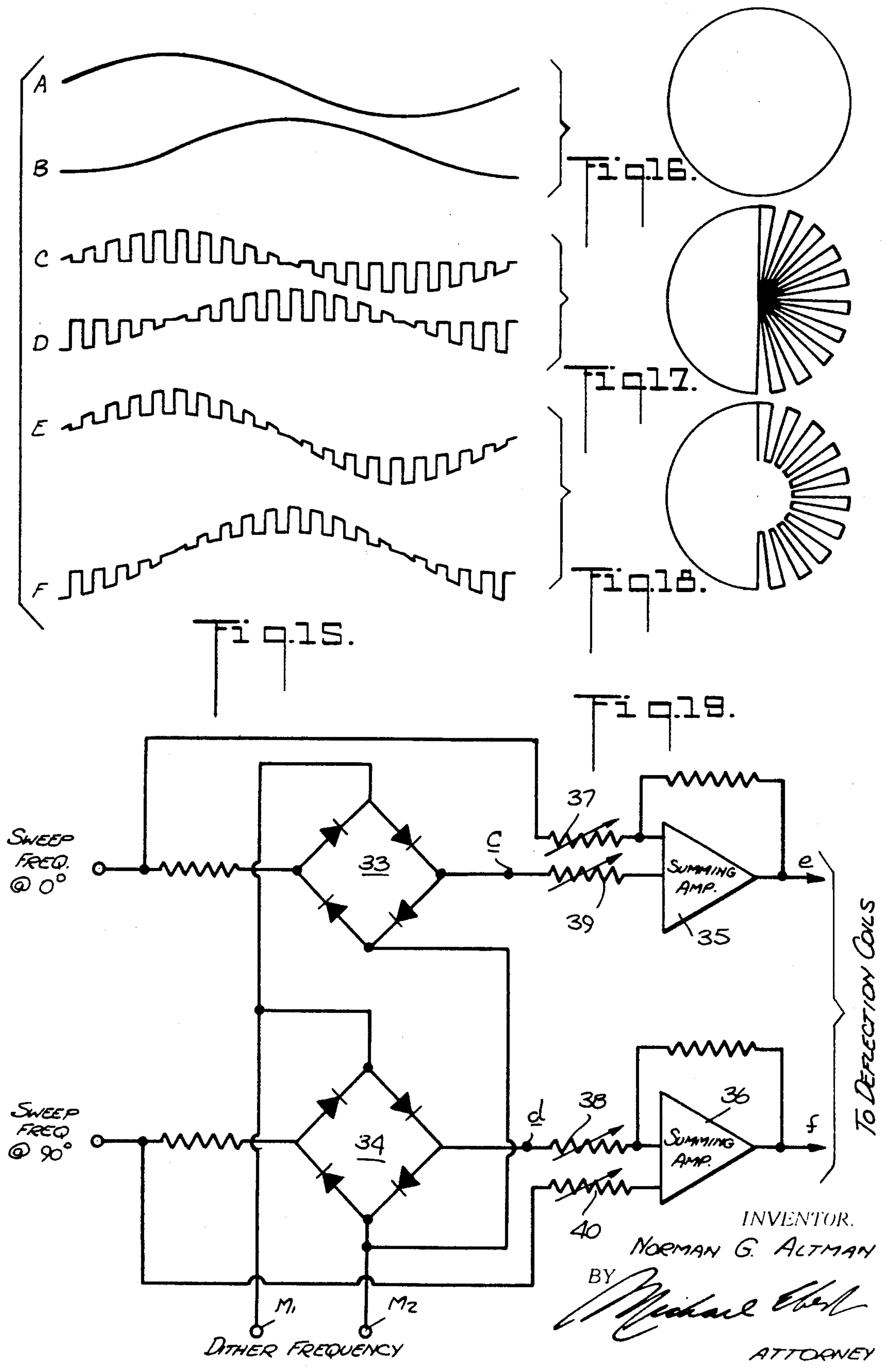

FIG. 12, A, B, C, D, E, and F shows the waveforms of the voltages of the system;

FIG. 13 illustrates the scan pattern on the photocathode area of the image dissector tube;

FIG. 14 is a block diagram of the system correlator;

FIG. 15, A, B, C, D, E and F, show the waveforms required for a dithered circular sweep;

FIG. 16 shows the scan pattern resulting from waveforms 15, A and B;

FIG. 17 shows the scan pattern resulting from waveforms 15, C and D;

FIG. 18 shows the scan pattern resulting from waveforms 15, E and F; and

FIG. 19 is a block diagram of the dither circuit for modulating the sweep voltages.

IMAGE DISSECTOR

Figure 1:
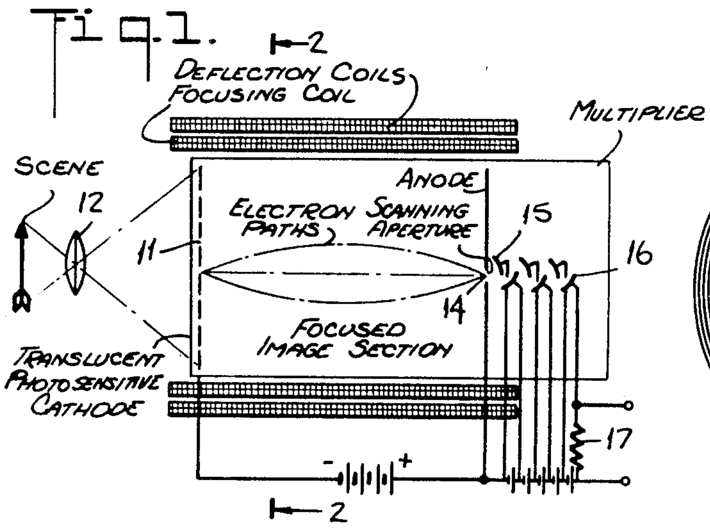
Figure 2:
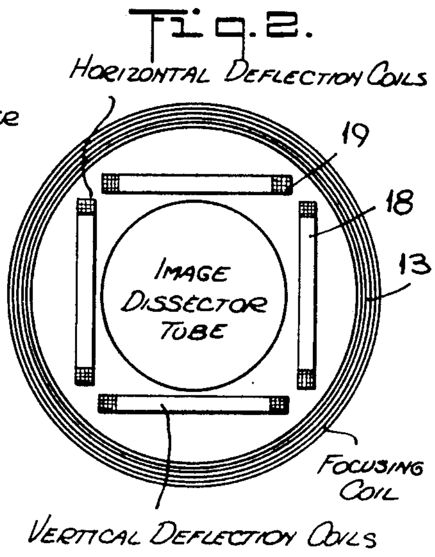
FIG. 2 is a transverse section taken in the plane indicated by line 2–2 of FIG. 1.

Referring now to the drawings and more particularly to FIGS. 1 and 2, there is shown an image dissector tube, generally designated by numeral 10. In a tube of this type, a light or other radiant-energy image is focused onto a photocathode which is followed by an electron optical focusing section forming an electron image of the emitted photoelectrons in the plane of a small defining aperture. An electron multiplier is operatively associated with this aperture, and a deflection system, either magnetic or electric, is provided for deflecting the electron image over the defining aperture in such a way that various portions of the image are examined in a desired sequence.

The scene or area being observed is projected by a lens system 12 onto the photocathode 11, which is a semitransparent or translucent layer. An electronic lens including focusing coil 13 acts to form a sharply defined electron image of the photocathode surface onto the plane of an anode having a small defining aperture 14 therein. Because of the sharp focusing action of the electron lens, the defining aperture, in turn, defines a small, limited area on the photocathode, from which signal and dark noise can originate. All remaining photocathode noise and signal is effectively eliminated.

Image dissector tubes generally of this type are currently manufactured and sold by the ITT Industrial Laboratories of Fort Wayne, Indiana, which tubes are designated by type numbers F4003, F4004, F4005, FW–142, FW–118, among others.

The small photocathode area which is effective at any instant in time, is called the "instantaneous effective photocathode area," and is referred to in terms of the instantaneous effective photocathode dimension or "IEPD." Following the defining aperture 14, whose physical dimensions are commonly less than the "IEPD" dimensions because of electron optical demagnification present in most tubes, is a more or less conventional multiplier having a series of dynodes 15 and a collector 16 to produce an amplified signal across the load resistor 17. The gain is in the order of $10^{+7}$ or more, depending on the applied voltage, and is sufficient so that amplifier, load resistance and other external noise sources, can usually be made negligible.

Horizontal deflection coils 18 and vertical deflection coils 19 surround the image section of the tube, making it possible to deflect the electron trajectories between the photocathode and defining aperture, thereby allowing the effective cathode area to be moved magnetically at will to any desired location on the total formed photocathode surface. The small effective photocathode area (IEPD) can be moved from its zero-deflection axial location to any position on the formed photocathode surface, by passing the proper current through these deflection coils.

V/H SYSTEM

Figure 11:
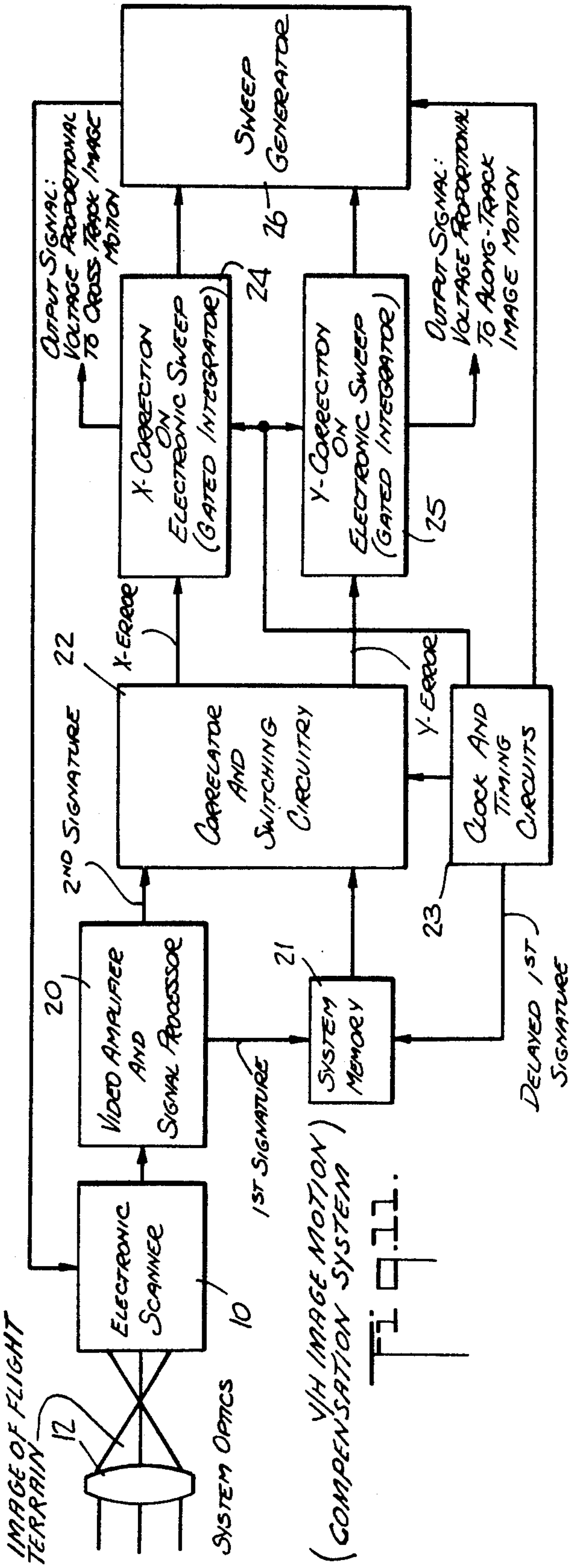
FIG. 11 is a block diagram of a system that is a specific embodiment of the general principles of the invention, namely, a V/H sensor.

Referring now to FIG. 11, there is shown a pattern-recognition arrangement in accordance with the invention, making use of image dissector tube 10 to effect image motion-compensation for a V/H system. The normal requirements for a V/H system used with high-resoltuion cameras, are that the system shall be capable of providing a measurement of image motion along two axes. The measurement resolution must be appreciably greater (at least five times) than the final resolution required on the resulting photography. The image of the area being observed from the moving vehicle is cast by lens system 12 onto the photocathode of tube 10.

It is necessary, in this system, to resolve image motion into two orthogonal components, one along the direction of vehicle heading, usually referred to as "alongtrack" image motion, and a second component, that is the motion of the image perpendicular to the direction of vehicle heading, normally called "crosstrack" image motion. The second component usually results from a wind with a crosstrack component.

In existing systems, where an attempt is made to measure image motion, crosstalk components are developed between the two vectoral components of image motion, this crosstalk results from intermodulation between the alongtrack and crosstrack components. In the present invention, crosstalk components are virtually eliminated by reason of the sequential scan pattern developed in the dissector tube.

Referring now to FIG. 13, the scan pattern appearing on the effective area of photocathode 11 is illustrated. The initial scan $S$ is made adjacent the bottom of the image established on the photocathode area. One portion $Y$ of scan $S$ is given over exclusively to measuring "alongtrack" image motion, and the other portion $X$, to measuring "crosstrack" image motion. In this example, we are assuming that during a vehicle's flight, the image moves from the bottom toward the top of the scanned area and that the initial scan is taken with the image near the bottom.

In a subsequent scan $S'$ taken after the vehicle has moved forward, the portion $Y'$ of the scan is again devoted to measuring "alongtrack" image motion, and the other portion $X'$, to measuring "crosstrack" image motion.

During initial scan $S$, image dissector tube 10 generates an electrical signal which is in effect a signature representative of the image near the bottom of the photocathode. This first signature is applied to a video amplifier and signal processor circuit 20 which amplifies the signal and directs it to a memory device 21 where the amplified first signature is memorized. The subsequent or second signature $S'$ is amplified in amplifier and signal processor 20 and fed to one input of a correlator 22, the first signature being simultaneously fed to the other input of the correlator.

The use of auto and cross-correlation techniques as a means of indicating the relationship between two variables and as a technique for interpreting electrical activity, is well known. In the present invention, correlator 22, which may be of known design, is responsive to the first and second signatures, one representing the initial scan $S$, and the second the subsequent scan $S'$ which takes place after the image has been displaced by reason of vehicle motion or other factors.

The $X$ and $Y$ motions are applied to the aperture of the image dissector tube in sequence, hence the $X_e$ and $Y_e$ error signals derived from the output of correlator 22 as a result of image motion, are time-separated. This is a crucial aspect of the present invention, and must be clearly understood. In this connection, reference is made to the timing diagram shown in FIG. 12.

The periodic voltage applied to the vertical deflection coils 19 to produce the $Y$ or vertical portion of the scanning pattern ($S$ or $S'$), is shown in FIG. 12A. It will be seen that each cycle of this periodic voltage is constituted by a sawtooth or deflection voltage portion $DY$, and a square or nondeflection voltage portion $ZY$. The periodic voltage applied to horizontal deflection coil 18 to produce the $X$ or horizontal portion of the scanning pattern, is shown in FIG. 12B, and it will be seen that each cycle has a square or nondeflection voltage portion $ZX$ and a sawtooth or deflection voltage portion $DX$. The deflection voltage portions $DY$ of the $Y$ deflection drive voltage are coincident with the nondeflection portions $ZX$ of the $X$ deflection drive voltage, whereas the nondeflection voltage portions $ZY$ of the $Y$ drive voltage are coincident with the deflection portions $DX$ of the $X$ drive voltage.

Thus in operation, first the $Y$ drive voltage moves the scan up the face of the dissector tube, the scanning aperture being thereafter maintained for the remainder of the cycle at the fixed $Y$ position while the $X$ drive voltage is applied to move the scanning aperture across the face of the tube from left to right. Then both the $X$ and $Y$ drive voltages are returned to zero, bringing the deflection aperture to its original starting point, after which the cycle is repeated. It is to be noted that the leading edge of the sawtooth or deflection portion in each cycle of the $Y$ drive voltage is coincident with the leading edge of the square or nondeflection portion in each cycle of the $X$ drive voltage.

Because the $X$ and $Y$ motions are applied to the dissector aperture sequentially, the resultant $X$ and $Y$ error signal components produced in the composite output of the correlator are time-separated, as shown by the composite signal in FIG. 12C. It will also be seen that the X-error signal components in the composite signal are coincident with the $DX$ deflection voltage portions, while the Y-error signal component is coincident with the $DY$ deflection voltage portions.

In order to sort the $X$ and $Y$ error signal components from each other, correlator 22 is provided with electronic gating devices, one set being rendered operative during the time of $Y$ motion, and the other set during the time of $X$ motion. Consequently, after sorting, the $Y_e$ error signal, as shown in FIG. 12E, has, in each cycle, an error component and a blank component, whereas the $X_e$ error signal, as shown in FIG. 12F, has a blank component and an error component in each cycle thereof, the $X_e$ and $Y_e$ signals being 180° out of phase.

The necessary clock signals to coordinate the operation of the gating devices in the correlator 22, and to synchronize the function of memory 21 with other elements of the system, are derived from a clock circuit 23.

$X_e$ error signal is applied to an X-correction integrating circuit 24 to produce a DC output proportional thereto, while the $Y_e$ error signal is applied to a Y-correction integrating circuit to produce a DC output proportional thereto. These DC signals, which are representative respectively of the $X$ and $Y$ motion errors, are applied directly to sweep generator 26 which produces the $X$ and $Y$ drive voltages for the deflection coils of the dissector tube 10, thereby closing the tracking servo loop and acting to stabilize the image on the photocathode. The DC output signal of the X-correction circuit 24 is proportional to crosstrack image motion, whereas the DC output signal of the Y-correction circuit is proportional to alongtrack image motion, these voltages being used to effect the necessary camera corrections.

It is to be noted that in a system in accordance with the invention, motion of the scanned area "up" the image is altogether independent of motion of the scanned area across the image, hence the two servos are completely independent of each other. This complete independence is desirable not only for instrumentation accuracy and cleanliness of servonull, but also because of the technique normally used to correct for the crosstrack and alongtrack factors in a photographic mission.

Crosstrack motion is usually corrected by rotating the camera and its mount in the vehicle, or by trimming the vehicle itself, so that it flies along the desired ground track. Compensation for alongtrack image motion is performed within the camera itself and usually entails moving some element in the optical train or even moving the film itself.

It will be appreciated that the invention is not limited to V/H applications and is usable for pattern recognition generally wherever the recognition is based on mathematical functions rather than on character.

APERTURE CONTROL

Figure 3:
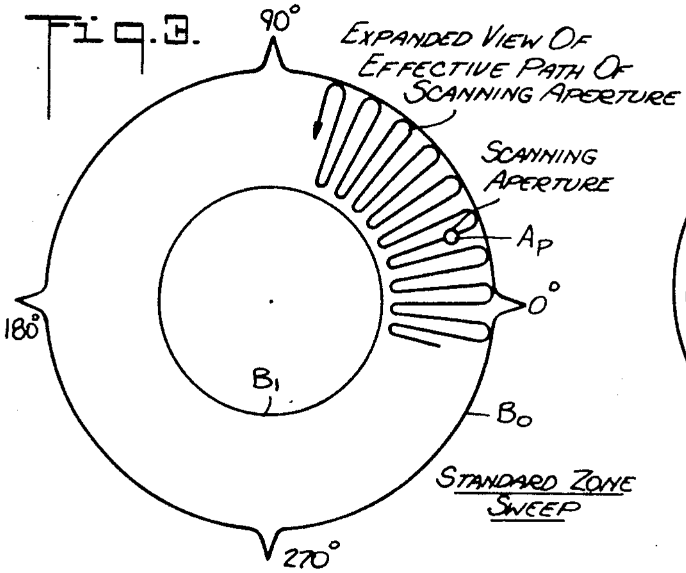
FIG. 3 illustrates the manner in which an electronic analog of a mechanically scanning shaped aperture of controlled size is generated.

In a system in accordance with the invention, an electronic analog of mechanically scanning shaped aperture of controlled size can be generated by a technique illustrated in FIG. 3. Typically, a relatively small effective aperture $Ap$ in the image dissector tube (order of magnitude of 1mm. in a scan that is approximately 25mm. outer diameter) is made to describe the locus relative to the electron image generated by the image dissector by suitable deflection modulation of the electron image.

This is generally accomplished, as shown in FIG. 3 in a circular scan, by a high frequency modulation voltage $M$. The parameters are so chosen that the frequency of the circular scan is typically 1 kc., with a radial modulation frequency of typically 1 megacycle, producing in this instance 1000 full radial excursions from the inner boundary B, to the outer boundary $B_o$ of the annular for each full scan cycle. With a very small amount of electronic integration, the resultant video signal is indistinguishable from that which would be obtained using a mechanically driven slit aperture with a width of 1 mm. to cover the same annular region at a 1*kc* scan rate. By changing the amplitude of the modulating signal, and hence the length of the radial excursion, the effective length of the aperture can be controlled electronically.

The effect on the signal signature of distortion of the image scanned by the image dissector can be reduced by closing a set of high speed electronic servo loops. The results of this correction process for the "standard" distortions are shown pictorially in FIGS. 4 through 10. System operation is such that the image dissector scan is distorted to develop congruence between its video signal and that used as a reference.

Figure 4:
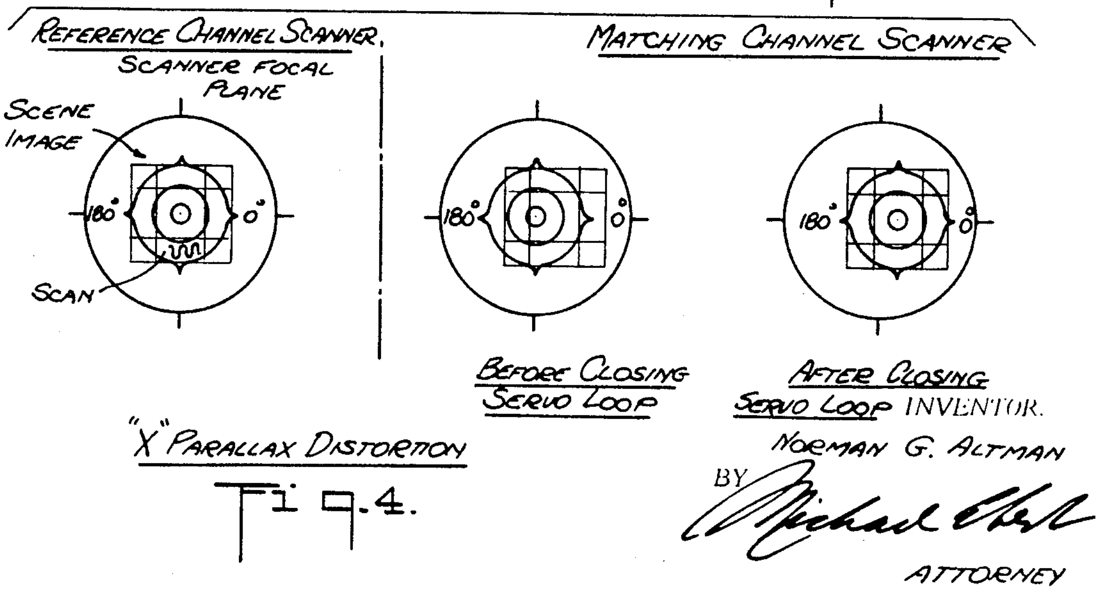
FIG. 4 illustrates the manner of correcting for "X" displacement.

As used herein, the "standard" distortions and displacements include the following:

X Displacement
Y Displacement
$\theta$ (Rotational) Displacement
Isotropic Scale Change
Anamorphic Scale Change (along any vector)
Trapezoidal Distortion FIG. 4 shows the reference configuration on the left (as do FIGS. 5 to 10). The right-hand views in FIGS. 4 to 10 show the existence of displacement or distortion both before and after the internal electronic servo loop is closed. The result of closing the loop is to displace or distort the annular scan such that it centers itself within the portion of the image scanned by the reference channel annulus, to generate a video signal that is as close as possible to that of the reference channel.

Figure 5:
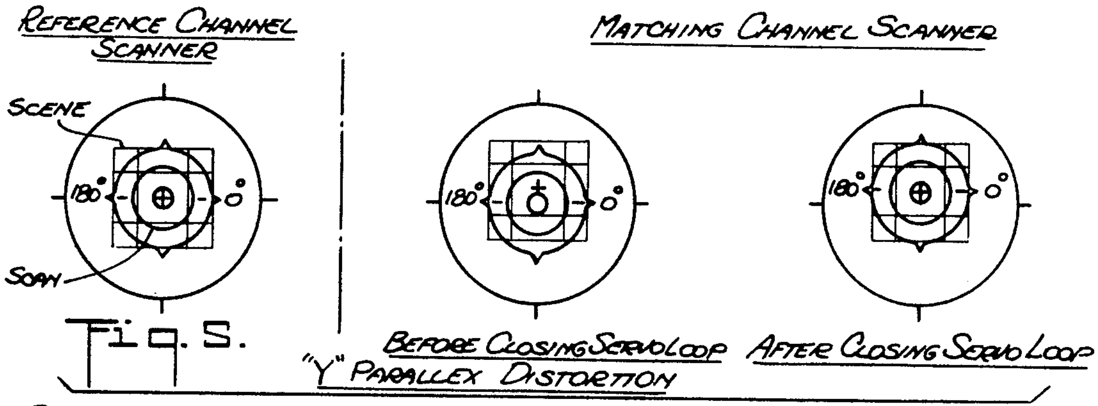
FIG. 5 illustrates the manner of correcting for "Y" displacement.

FIG. 5 shows the effect of Y displacement with the left view again being the reference scan and the right-hand views showing Y image displacement with the electronic servo loop open, and the effect of closing this loop. Closing the loop results in displacing the scan, as it did in the case of X displacement; however, in this case the scan is displaced vertically, but the final result is the same, namely, that the video output from the matching scanner channel is made to be as close to identical as possible to that of the reference channel.

Figure 6:
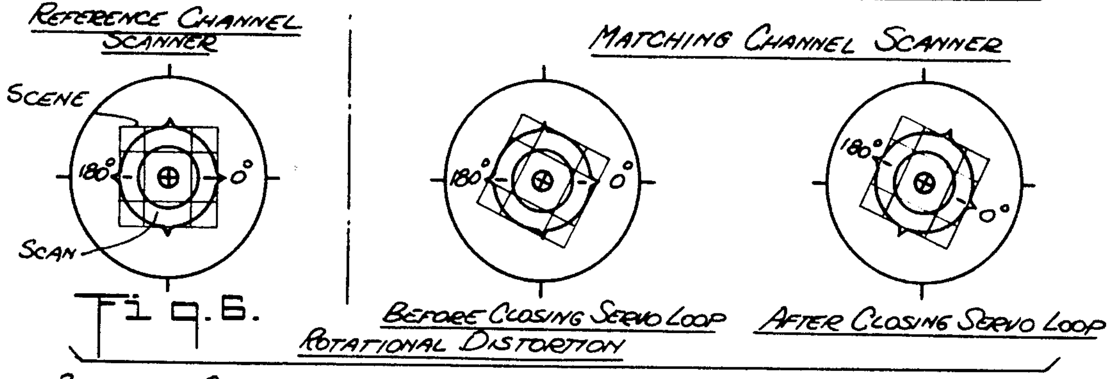
FIG. 6 illustrates the manner of correcting for rotational distortion.

FIG. 6 shows the effect of rotation of the image. In this case, after the servo loop is closed, the scan reference is rotated; the appropriate servo drives the two scans so that the video signal of the reference and the matching channel are made as close to identical as possible. This is accomplished by controlling a phase shift network in order to shift the phase of the signal that is used for the basic matching channel lissajou pattern such that the position of all of the reference points (that is, 0°, 180°, etc.,) are rotated by an amount precisely equal to the amount of rotation between the two images.

Figure 7:
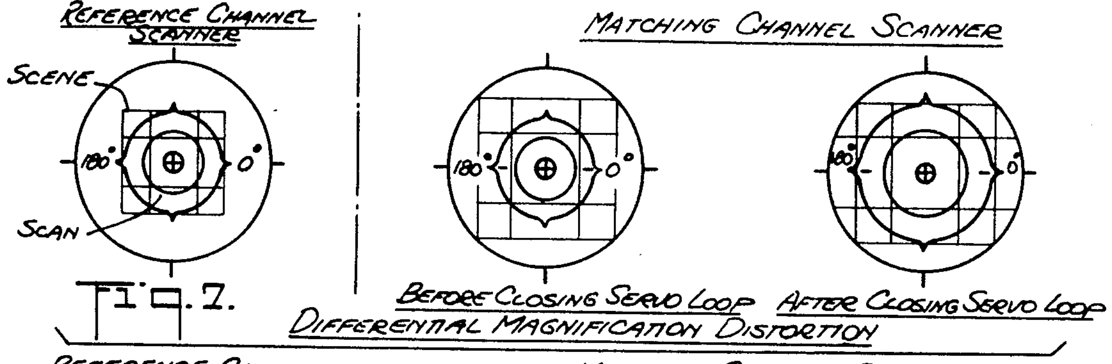
FIG. 7 illustrates the manner of correcting for differential magnification distortion.

FIG. 7 shows the effect of difference in scale or magnification between the two images. Again, the situation is shown before the servo loop is closed and after. The scan in this case is increased in diameter.

Figure 8:
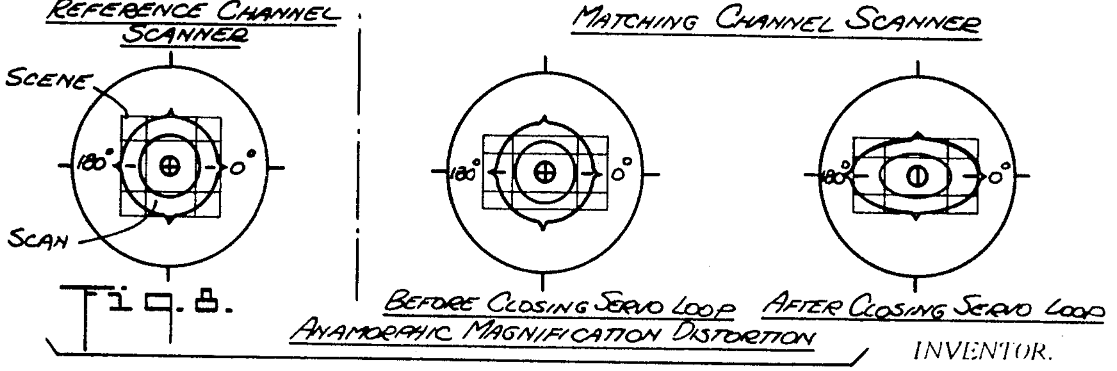
FIG. 8 illustrates, the manner of correcting for anamorphic magnification distortion.

FIG. 8 shows anamorphic distortion along the principal axes and the manner in which it is corrected.

Figure 9:
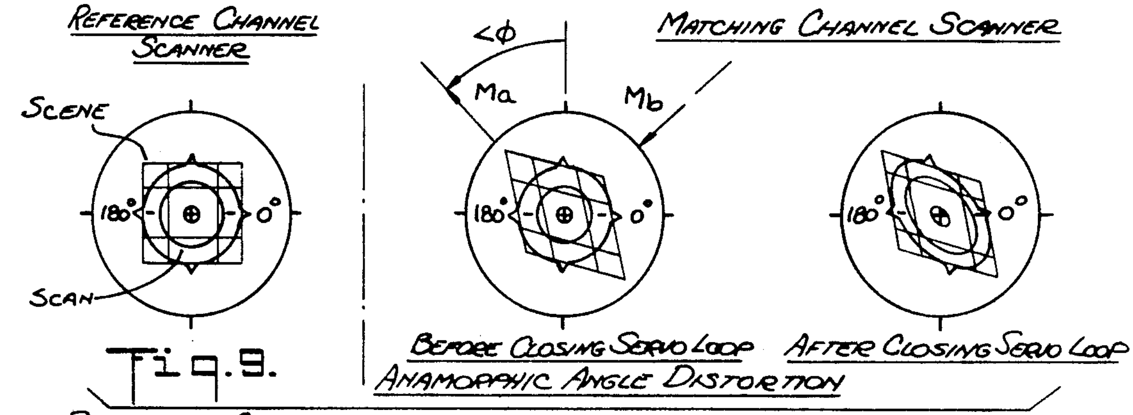
FIG. 9 illustrates the manner of correcting for anamorphic magnification distortion at an arbitrary angle.

FIG. 9 shows anamorphic distortion that results in converting the basic square of the reference into a parallelogram, that is, anamorphic distortion is in a direction other than the principal axes. In this case, the anamorphic control must apply change in gain in directions other than those coincident with the major axes. The closed-loop operation of the system insures that the magnitude and phase of the generated anamorph signals are proper to produce the scan distortion required to reduce to zero the differences between the reference video and the matching video.

Figure 10:
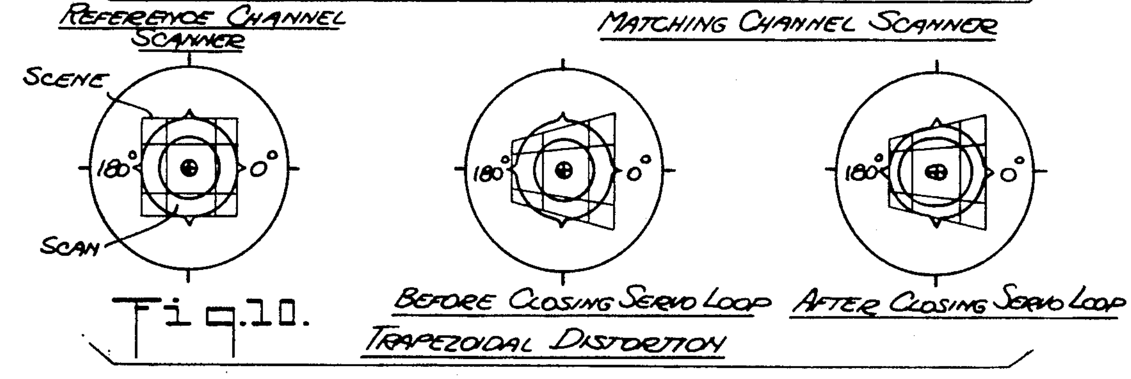
FIG. 10 illustrates the manner of correcting for trapezoidal distortion.

FIG. 10 shows trapezoidal distortion and the manner in which it is corrected.

In the V/H system disclosed herein, the scan is not circular but is composed of sequential Y and X components, as shown in FIG. 13. Hence in this instance, in order to control the effective aperture size, the X and Y scans are electronically modulated at a relatively high rate to effectively enlarge the aperture size, as indicated by the sinusoidal modulation components $M_x$ and $M_Y$ imposed on the X and Y sweep voltage in the sweep generator.

SYSTEM MEMORY

The memory device which is used in the system shown in FIG. 11, may be of any one of several standard memory circuits. An advantage in system configuration and simplicity arises when a First-In, First-Out (FIFO) type memory is used, since there is no necessity for random access to the memory. The incoming real-time video signal and the reference signal from the memory are always compared and correlated in phase. The FIFO-type memory stays in synchronization and no additional microprogramming commands are required to maintain the desired order either in going into or in coming out of system memory.

There are today two logical choices for such a FIFO memory. One choice is a memory drum in which one complete track is reserved for the stored information. The memory drum can serve as the system synchronizer by having additional tracks to provide synchronizing signals for the rest of the system. The other choice is a shift register, which can be used to store the video information if properly time-quantized. To prevent loss of information or resolution, the shift register requires a capacity equal to the maximum total number of quantizable time elements for one complete video scan.

Specifically, if we use a 1-kilocycle sweep rate so that a complete sweep is obtained in 1 millisecond, and if we wish to resolve 1 microsecond within this sweep period, the shift register will require at least 1,000 storage elements to provide sufficient capacity for this requirement. In actual practice, the register would probably have 2,000 storage elements to insure that the time-quantizing error has a minimum effect on system performance, resolution, and accuracy.

SYSTEM CORRELATOR

FIG. 14 shows a preferred form of correlator 22 for use in the system shown in FIG. 10. This is a canonical form of electronic correlator, in which two signals are compared by a process of cross-correlation. As used in the embodiment system, the "real time" video input $V$ is the signature derived from the subsequent scan $S'$, whereas the reference video input $R$ is the stored first signature derived from the first scan $S$ applied to the memory.

These inputs are applied to electronic delay circuits 27 and 28, respectively. The difference between the delayed version $VD$ of the real-time video input taken from delay circuit 27 and the reference input $R$ is determined by a process of subtraction in a subtractor 29. The difference between the delayed version $RD$ of the reference-video input taken from the output of delay 28, and the real-time input $V$, is determined in subtractor 30.

The difference between the output of subtractor 29 and the output of subtractor 30 is determined by a subtractor 31 to produce the output composite signal of the correlator. The outputs of subtractors 29 and 30 are also applied to a summing device 32 to produce a voltage indicative of the degree of correlation between the two original signals.

DITHERING CIRCUIT

In the V/H system disclosed herein, in order to dither or modulate the $X$ and $Y$ sweeps, it is necessary to impose a higher frequency-modulation component on the basic sweep waveform such that the effective scanning aperture is reciprocated and thereby enlarged.

The more general case in pattern recognition is that involving a circular scan of the electronic image so that in effect the dissector-tube aperture sweeps in a circular path, very much in the manner of a rotating scanning disc having an aperture therein. We shall therefore in connection with FIGS. 15A to F, consider the requisite waveforms for a dithered circular sweep.

The basic sinusoidal sweep voltages necessary to create a circular lissajou pattern are shown in FIGS. 15A and B. When voltages in this form are fed to the horizontal and vertical deflection elements of the image dissection tube, a circular scan is produced having the pattern shown in FIG. 16.

To effect dithering, it is necessary to impose a higher frequency modulation on the basic sweep voltages such that the effective aperture in the scan is moved back and forth in a radial path. This is illustrated by the waveforms in FIGS. 15C and D. Such modulation may be produced by a simple switch-type modulator generating a sweep pattern causing the effective aperture to traverse the full radial distance from the outer diameter (defined by the amplitude of the unmodulated waveforms shown in FIGS. 15A and B) to the center of the circle described thereby. The scan pattern obtained with dithered sweep voltages of the type shown in FIGS. 15C and D, is illustrated in FIG. 17.

In order to obtain an annular scan, it is necessary to control the degree of dithering to an extent determined by the desired width of the annulus. This dictates an additional step to achieve the necessary sweep waveform. This is shown in FIGS. 15E and F, wherein the envelope of the dithering signal is contained between two low frequency sine waves whose waveforms are identical to those in FIGS. 15A and B, except for amplitude. The resultant scan pattern, as shown in FIG. 18, is an annulus whose width is controlled by the depth of the modulation, i.e., the distance between the inner and outer low frequency envelopes in the waveforms shown in FIGS. E and F.

A circuit adapted to produce sweep voltages having the desired waveforms is schematically illustrated in FIG. 19. The circuit includes a pair of switch-type modulators 33 and 34, each constituted by four diodes in a standard bridge configuration. Applied to input terminal *a* of modulator 33, is a sweep frequency voltage at zero degrees corresponding to the waveform in FIG. 15A, while applied to input terminal *b* of modulator 34 is a sweep frequency displaced 90° corresponding to the waveform in FIG. 15B. Fed to both modulators is a modulating signal having the desired dither rate, this signal being applied at terminals $M_1$ and $M_2$.

The output of modulator 33 appears at terminal *c* and corresponds to the waveform of FIG. 15C, while the output of modulator 34 appears at terminal *d* and corresponds to the waveform of FIG. 15D. These outputs are applied as one input of the summing amplifiers 35 and 36, respectively. The other inputs to these amplifiers are the original, unmodulated sweep voltages taken from the modulator input terminals *a* and *b* (waveforms of FIGS. 15A and B). By adding the two input signals together in proper porportions, produced at the output terminals *e* and *f* of summing amplifiers 35 and 36, are output signals corresponding to waveforms 15E and F. These signals are fed to the horizontal and vertical deflection elements of the image dissector tube to produce the desired annular scan pattern shown in FIG. 18.

The relative proportions of the mixed input signals are adjusted by variable resistors 37, 38, 39 and 40. Resistors 37 and 38 control the magnitude of the unmodulated signals (FIGS. 15A and B) applied respectively to amplifiers 35 and 36, while resistors 39 and 40 control the magnitude of the modulated signals (FIGS. 15C and D) applied thereto, thereby providing the desired output signals at terminals *e* and *f*.

In dithering *X* and *Y* deflection voltages of the type shown in FIGS. 12A and B for the V/H system disclosed herein, one may apply these voltages to suitable modulators to impose a dithering frequency thereon.

While there has been shown and described a preferred embodiment of pattern recognition system in accordance with the invention, it will be appreciated that many changes and modifications may be made therein without, however, departing from the essential spirit of the invention as defined in the annexed claims.

I claim:

1. A pattern recognition system comprising:
   a. an image dissector tube including a photocathode and an anode having an aperture therein, an electronic image of a subject pattern optically projected on said photocathode being formed on said anode, and means to deflect said image with respect to said aperture and to multiply the electrons passing through said aperture to produce an output signal,
   b. scanning means to apply sweep voltages to said deflection means to produce in the output of said tube a signal signature which is a function of the scan of said pattern,
   c. means to impose a relatively high frequency modulation signal on the basic sweep voltages electronically to enlarge the effective size of said aperture,
   d. processing means coupled to said tube to integrate the signal signature in the output thereof to yield a signal signature which is effectively indistinguishable from that which would be obtained by using a mechanically driven slit aperture whose width covers a region equivalent to that produced by the electronically enlarged aperture; and
   e. means coupled to said processing means to compare the signal signature produced by scanning said subject pattern with a signal signature produced by scanning a reference pattern to effect pattern recognition.

2. A pattern recognition system as set forth in claim 1, wherein said scanning means is constituted by a sweep voltage generator for applying basic voltages to said deflection means for producing a circular scan pattern, which basic voltages are modulated to produce an annular scan pattern.

3. A pattern recognition system as set forth in claim 2, further comprising means to vary the amplitude of said modulating signal to vary the effective size of said aperture.

4. A pattern recognition system as set forth in claim 1, wherein said comparison means is constituted by a correlator.

5. A pattern recognition system comprising:
   a. an image dissector tube including a photocathode and an anode having an aperture therein, an electronic image of the pattern optically projected on said photocathode being formed on said anode, and means to deflect said image with respect to said aperture and to multiply the electrons passing through said aperture to produce an output signal,
   b. scanning means to apply sweep voltages to said deflection means to effect sequential deflection in an *X* direction and in a *Y* direction normal thereto to produce in the output of said tube a signal signature which is a function of the scan of said pattern, said scanning means including means to impose a relatively high frequency modulating signal on the basic sweep voltage electronically to enlarge the effective size of said aperture,
   c. processing means coupled to said tube to integrate the signal signature in the output thereof to yield a signal signature which is effectively indistinguishable from that which would be obtained by using a mechanically driven slit aperture whose width covers a region equivalent to that produced by the electronically enlarged aperture, and
   d. means coupled to said processing means to compare the signal signature produced by an initial scan with the signal signature produced in a subsequent scan.

6. A system as set forth in claim 5, wherein said comparison means includes:
   a memory device to store the signal signature produced by an initial scan, and
   a correlator coupled to said memory device and to said dissector tube to compare the signal signature produced by said initial scan with a signal signature produced in a subsequent scan to produce a composite signal having *X* and *Y* error signal components representative of a displacement in said pattern in the period between scans, and means coupled to said correlator to separate said X-error component from said Y-error component to produce *X* and *Y* error signals with no cross coupling.

7. A system as set forth in claim 5, wherein said system is a V/H system and is installed in a moving vehicle flying over terrain, optical means being provided to project an image of the flight terrain onto said photocathode.

8. A system as set forth in claim 5, wherein said deflection means is constituted by horizontal and vertical electromagnetic deflection coils.

9. A system as set forth in claim 8, wherein said scanning means includes circuit means producing respective periodic drive voltages for said horizontal and vertical coils, each cycle of which has a sawtooth deflection portion and a square nondeflection portion.

10. A system as set forth in claim 9, wherein the drive voltages for the horizontal and vertical coils produced by said circuit means are out of phase, whereby horizontal and vertical deflection takes place alternately.

11. A system as set forth in claim 6, further including an amplifier and signal-processing circuit coupled to the output of said tube for switching the initial signal signature to said memory device and for transferring the subsequent signal signature to said correlator.

12. A system as set forth in claim 6, wherein said means to separate the error signal components is constituted by two sets of gating means responsive to the composite signal, one gating means yielding said *X*-error signal and the other set said *Y*-error signal.